United States Patent

Goodacre

[15] 3,662,231

[45] May 9, 1972

[54] MOUNTING DEVICES FOR THYRISTORS

[72] Inventor: Ronald Goodacre, Basingstoke, England

[73] Assignee: Lansing Bagnall Limited, Basingstoke, Hampshire, England

[22] Filed: June 30, 1970

[21] Appl. No.: 51,121

[30] Foreign Application Priority Data

July 2, 1969 Great Britain ....................33,380/69

[52] U.S. Cl. ....................................317/234 R, 317/234 P

[51] Int. Cl. ......................................................H01l 3/00

[58] Field of Search ..................317/234 P, 234 N; 339/112, 339/147, 17 C; 29/589, 591

[56] References Cited

UNITED STATES PATENTS

| | | | |
|---|---|---|---|
| 3,395,321 | 7/1968 | Boyer | 317/234 P |
| 3,174,386 | 3/1965 | Lewis | 85/62 |
| 2,927,953 | 3/1960 | Staller | 339/112 |
| 3,188,536 | 6/1965 | Rittmann | 317/234 P |

*Primary Examiner*—Marvin A. Champion
*Assistant Examiner*—Lawrence J. Staab
*Attorney*—E. T. Le Gates

[57] ABSTRACT

A mounting device for a thyristor comprising a longitudinally collapsible corrugated tube one end of which engages the thyristor when it is resting against a surface. A clamping structure engages the other end of the tube, and there are means to secure the clamping structure to the surface, which means are adjustable to urge the structure towards the surface so as to deform the tube longitudinally and thereby press the thyristor against the surface. The construction of the collapsible tube is such that the load in the tube, when it is deformed, is substantially independent of the extent of its deformation.

9 Claims, 2 Drawing Figures

MOUNTING DEVICES FOR THYRISTORS

Figure 1:
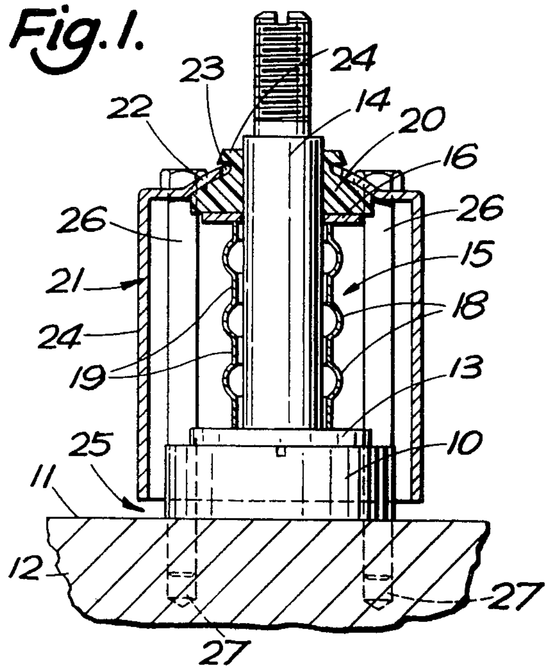

The invention relates to mounting devices for thyristors and particularly for thyristors which are in the form of a flat disc. When mounting such a thyristor against a surface it is desirable that a predetermined load be applied to the thyristor to press it against the surface. This has been achieved in known forms of mounting devices by employing in the device some form of spring for example an assembly of Belville washers i.e. spring washers which are generally conical in shape. The spring urges the thyristor against the surface and is arranged to be deformed to a predetermined extent as the mounting device is clamped to the surface. In such devices the extent of deformation of the spring will depend on the thickness of the thyristor and thus, generally speaking, a mounting device for use with a thyristor of a certain thickness will not be suitable for use with thyristors of a different thickness since using a thyristor of different thickness will cause the loading of the spring to differ from the desired predetermined value.

According to the invention a mounting device for a thyristor comprises a deformable element for engagement with the thyristor when it is resting against a surface, a clamping structure engageable with the deformable element and having means to secure the clamping structure to the surface, which means are adjustable to urge the structure towards the surface so as to deform the deformable element and thereby press the thyristor against the surface, the deformable element being such that the load in the element, when deformed, is substantially independent of the extent of deformation. By "substantially independent" is meant that the load in the element does not vary significantly with deformation over a range corresponding to the likely differences in thickness of conventional forms of thyristor.

It will be appreciated that since the load in the deformable element does not depend on the degree of its deformation it will also not depend on the thickness of the thyristor and thus the mounting device will impart a desired predetermined load to a range of thyristors of different thicknesses.

The deformable element may comprise a longitudinally collapsible tube which is loaded axially by adjustment of the clamping structure towards the surface. For example the tube may be formed along its length with a plurality of circumferentially extending corrugations. Each corrugation is preferably arcuate in cross section and projects radially outwards from the tube. The corrugation may be spaced apart along the length of the tube, the portions of the tube between the corrugations being cylindrical.

The clamping structure may be in the form of a cup-like cover surrounding the collapsible tube with its rim spaced from the surface, clamping means being provided to urge the cup-like cover towards the surface, so that part of the cover presses against the end of the tube remote from the surface so as to deform the tube axially.

The clamping means may comprise a number of bolts passing through parts of the cup-like cover for engagement with threaded holes in said surface.

It will be appreciated that in any of the above arrangements the side of the thyristor which is not engaging the surface must not be electrically connected to the surface. This may be achieved by making at least a part of the clamping structure electrically insulating so as to insulate the deformable element from the surface against which it presses the thyristor. For example the electrically insulating part of the clamping structure may be that part which engages the deformable element.

Part of an electrical terminal may be disposed between the deformable element and the thyristor whereby deformation of the element to press the thyristor against the surface also presses the part of the terminal into firm electrical contact with the thyristor. The electrical terminal may be located by the clamping structure, and in this case the part of the clamping structure which engages the terminal should be electrically insulating.

Figure 2:
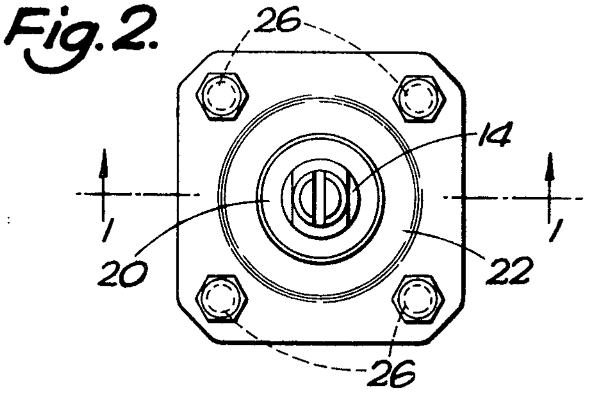

The following is a more detailed description of one embodiment of the invention, reference being made to the accompanying drawings in which:

FIG. 1 is a vertical cross section through a mounting device for a thyristor; and FIG. 2 is a plan view of the device shown in FIG. 1.

The thyristor 10 is in the form of a thick circular disc and is to be clamped into engagement with the surface 11 of a heat sink 12. A circular metal contact disc 13 rests on the upper surface of the thyristor and projecting upwardly from the disc 13, and connected to it, is a pillar-like electrical terminal 14.

A collapsible thin-walled tube 15, of low-carbon steel, encircles the terminal 14. The steel tube 15 is formed with circumferentially extending corrugations 18. The corrugations 18 are arcuate in cross section, as seen in FIG. 1, and the portions 19 between the corrugations are cylindrical. In the arrangement shown there are three corrugations 18 but the tube may be formed with any other suitable number of corrugations.

A cap 20 of nylon or other electrically insulating material encircles and locates the upper end of the terminal 14. A metal washer 16 encircles the terminal 14 below the cap 20 and bears on the upper end of the tube 15. The cap 20 and washer 16 are slidable up and down on the terminal 14. Encircling the terminal 14 and tube 15 is an inverted cup-like cover 21 the closed upper wall 22 of which is partly spherical in shape and is formed with an aperture 23 which encircles the neck portion 24 of the cap 20 which is similarly shaped so that the wall 22 bears down on the cap. The peripheral wall 24 of the cup-like cover is of such a depth that there is a gap 25 between the lower rim of the peripheral wall and the surface 11 when a thyristor of the smallest thickness to be used with the device is disposed between the plate 13 and the surface 11.

Four bolts 26 pass through apertures in the upper wall 22 of the cup-like cover and engage threaded holes 27 in the surface of the heat sink. The spherical seating between the parts 20 and 22 enables the bolts 26 and the cover 21 to be readily aligned.

In the arrangement shown the tube 15 engages the disc 13 of the terminal and presses it into firm electrical contact with the thyristor. In some cases, however, the terminal may be permanently fixed to the thyristor.

In use the thyristor 10 is placed in the required position against the surface 11 and the device is placed over it with the bearing plate 13 resting against the upper surface of the thyristor. The bolts 26 are then inserted and are screwed down evenly until resistance is felt indicating that the tube 15 has been begun to be compressed and hence loaded axially. During this time the gap 25 will tend to close.

The tube 15 is of such a kind that the load which it applies to the thyristor is substantially independent of its extent of deformation and thus no matter how much the bolts 26 are tightened the loading on the thyristor will be substantially the same. The bolts can be tightened until the gap 25 has closed but this is not essential.

It will be appreciated that the loading applied by the tube 15 will be the same regardless of the thickness of the thyristor.

Once the mounting device has been used with one particular thyristor it may also be used with a different thyristor provided that the new thyristor is of such a thickness that there is still a gap 25 between the cover 21 and the surface 11. It will be appreciated that once the tube 15 has been deformed it will not recover significantly but it can be deformed further and will then give substantially the same loading.

It will also be appreciated that it will be a relatively simple matter to fit a new tube 15 when replacing a thyristor, if the existing tube does not appear to apply an adequate load.

We claim:

1. A mounting device for a thyristor comprising a deformable element for engagement with the thyristor when the thyristor is resting against a surface, a clamping structure engageable with the deformable member, and adjustable means to urge the structure toward the surface so as to bear on the deformable member and thereby deform the member and press the thyristor against the surface, the deformable member comprising a longitudinally collapsible tube preformed with at least one circumferentially extending corrugation, the tube being formed from a substantially non-resilient material whereby the load in the member, upon any deformation thereof, is substantially independent of the extent of that deformation.

2. A mounting device according to claim 1 wherein the tube is formed along its length with a plurality of circumferentially extending corrugations.

3. A mounting device according to claim 2 wherein each corrugation is arcuate in cross section.

4. A mounting device according to claim 2 wherein each corrugation projects radially outwards from the tube.

5. A mounting device according to claim 2 wherein the corrugations are spaced apart along the length of the tube, the portions of the tube between the corrugation being

6. A mounting device according to claim 1 wherein at least a part of the clamping structure is electrically insulating to insulate the deformable element from the surface against which is pressed the thyristor.

7. A mounting device according to claim 6 wherein the electrically insulating part of the clamping structure is that part which engages the deformable element.

8. A mounting device according to claim 6 wherein part of an electrical terminal is disposed between the deformable element and the thyristor whereby deformation of the element to press the thyristor against the surface also presses the part of the terminal into firm electrical contact with the thyristor.

9. A mounting device according to claim 8 wherein the electrical terminal is located by the clamping structure, that part of the clamping structure which engages the terminal being electrically insulating.

* * * * *

UNITED STATES PATENT OFFICE
CERTIFICATE OF CORRECTION

Patent No. 3,662,231 Dated May 9, 1972

Inventor(s) Ronald Goodacre

It is certified that error appears in the above-identified patent and that said Letters Patent are hereby corrected as shown below:

Column 3, claim 5, line 3, after "being" add --cylindrical--.

Signed and sealed this 10th day of October 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334